US 6,714,310 B1

(12) United States Patent
Tanaka et al.

(10) Patent No.: US 6,714,310 B1
(45) Date of Patent: Mar. 30, 2004

(54) COORDINATE INPUT APPARATUS AND METHOD, AND COMPUTER-READABLE MEMORY THEREFOR

(75) Inventors: Atsushi Tanaka, Yamato (JP); Masahide Hasegawa, Yokohama (JP); Kiwamu Kobayashi, Yokohama (JP); Masaaki Kanashiki, Yokohama (JP); Yuichiro Yoshimura, Kamakura (JP); Katsuyuki Kobayashi, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 325 days.

(21) Appl. No.: 09/655,775

(22) Filed: Sep. 5, 2000

(30) Foreign Application Priority Data

Sep. 6, 1999 (JP) .......................... 11-251935

(51) Int. Cl.[7] .............................. G01B 11/14
(52) U.S. Cl. ...................................... 356/614
(58) Field of Search ................ 356/614, 3.02, 356/3.01, 3.1; 250/216, 227.13; 345/156, 179, 182, 183, 180; 178/18.01, 18.02

(56) References Cited

U.S. PATENT DOCUMENTS

| 4,320,292 | A | * | 3/1982 | Oikawa et al. | ........ 250/227.11 |
| 4,959,805 | A | * | 9/1990 | Ohouchi et al. | ............... 707/5 |
| 5,341,155 | A | | 8/1994 | Elrod et al. | |
| 5,499,098 | A | | 3/1996 | Ogawa | |
| 5,502,568 | A | * | 3/1996 | Ogawa et al. | ............... 356/620 |
| 5,523,844 | A | | 6/1996 | Hasegawa et al. | |
| 5,572,251 | A | * | 11/1996 | Ogawa | .................. 348/207.99 |
| 5,587,558 | A | * | 12/1996 | Matsushima | ............. 178/18.01 |
| 5,627,565 | A | * | 5/1997 | Morishita et al. | ........... 345/158 |
| 5,806,287 | A | * | 9/1998 | Pettersen et al. | ........... 356/614 |
| 5,838,302 | A | * | 11/1998 | Kuriyama et al. | .......... 345/173 |
| 6,028,592 | A | * | 2/2000 | Umeda et al. | .............. 345/156 |
| 6,114,685 | A | * | 9/2000 | Sato et al. | .............. 250/214 R |
| 6,339,748 | B1 | * | 1/2002 | Hiramatsu | .................. 702/159 |

FOREIGN PATENT DOCUMENTS

| JP | 6-274266 | 9/1994 |
| JP | 07-076902 | 3/1995 |
| JP | 2503182 | 3/1996 |
| WO | 91/01543 | 2/1991 |

* cited by examiner

Primary Examiner—Zandra V. Smith
Assistant Examiner—Gordon J Stock, Jr.
(74) Attorney, Agent, or Firm—Fitzpatrick, Cella, Harper & Scinto

(57) ABSTRACT

A plurality of linear sensors (20Xa, 20Xb, 20Ya, 20Yb) sense a beam spot and the results of sensing the beam spot are corrected. The corrected items of data are concatenated and coordinates corresponding to the beam spot are calculated by a coordinate calculation unit (32) based upon the concatenated data. Light-receptive areas of the linear sensors (20Xa, 20Xb, 20Ya, 20Yb) have mutually overlapping portions.

10 Claims, 17 Drawing Sheets

FIG. 3

| SWITCH A | SWITCH B | SWITCH C | SWITCH D | LIGHT EMISSION | PEN DOWN | PEN BUTTON |
|---|---|---|---|---|---|---|
| × | × | — | — | OFF | OFF | OFF |
| ○ | × | × | × | ON | OFF | OFF |
| ○ | × | ○ | × | ON | ON | OFF |
| ○ | × | × | ○ | ON | OFF | ON |
| ○ | × | ○ | ○ | ON | ON | ON |
| ○ | ○ | — | — | ON | ON | ON |
| × | ○ | — | — | ON | ON | OFF |

COORDINATE INPUT APPARATUS AND METHOD, AND COMPUTER-READABLE MEMORY THEREFOR

FIELD OF THE INVENTION

This invention relates to a coordinate input apparatus and method in which light from a designating tool is applied to a prescribed position on a coordinate input screen to produce a beam spot and coordinates corresponding to the beam spot are generated. The invention further relates to a computer-readable memory storing the program code for this apparatus and method.

BACKGROUND OF THE INVENTION

Known examples of an input apparatus according to the prior art include one in which a beam spot on a screen is sensed using a CCD area sensor or linear sensor and image processing using coordinates of the center of gravity or pattern matching is executed to calculate and output coordinate values, and one in which use is made of a position sensing device referred to as a PSD (an analog device in which an output voltage corresponding to the position of the spot is obtained).

By way of example, the specification of Japanese Patent Publication (KOKOKU) No. 7-76902 discloses an apparatus in which a beam spot produced by a parallel beam of visible light is sensed by a video camera to detect the coordinates of the beam spot and, at the same time, a control signal is sent and received in the form of infrared diffused light. Further, the specification of Japanese Patent Application Laid-Open (KOKAI) No. 6-274266 discloses an apparatus in which coordinates are detected using a linear CCD sensor and a special optical mask.

On the other hand, Japanese Patent No. 2503182 discloses the construction of an apparatus which uses a PSD and a method of correcting output coordinates in this apparatus.

Improvements in the brightness of large-screen displays are continuing and, at the same time, these displays are being increased in size and provided with higher resolution.

A small, inexpensive apparatus which uses a ring CCD and is strongly resistant to the effects of extraneous light has been proposed as such a coordinate input apparatus. With this coordinate input apparatus, the pixels of the CCD are partitioned by computation to obtain a resolution that is $2^N$ times the actual number of pixels. For example, in a case where a 64-pixel CCD is used and the screen is divided into 1024 portions to accommodate a larger screen, a large-screen coordinate input apparatus can be constructed in theory if one pixel is divided into 16 portions. However, though resolution can be raised in this case, a problem which arises is that the apparatus is readily susceptible to the effects of extraneous light, namely light other than input light from a designating tool.

SUMMARY OF THE INVENTION

Accordingly, an object of the present invention is to provide a coordinate input apparatus, method and related computer-readable memory through which a large screen and high resolution can be obtained and coordinates can be input in highly precise fashion.

According to the present invention, the foregoing object is attained by providing a coordinate input apparatus in which light from a designating tool is applied to a prescribed position on a coordinate input screen to produce a beam spot and coordinates corresponding to the beam spot are generated, the apparatus comprising: a plurality of sensing means provided in the vicinity of at least one coordinate axis for sensing the beam spot; correction means for correcting results of sensing from each of the plurality of sensing means; concatenation means for concatenating data that has been corrected by the correction means; and output means for outputting coordinate values corresponding to the beam spot based upon the data concatenated by the concatenation means; wherein light-receptive areas of the plurality of sensing means have overlapping portions.

The correction means preferably corrects the results of sensing from each of the plurality of sensing means based upon reference coordinate values that have been stored in advance.

Each of the plurality of sensing means preferably is a linear sensor comprising a plurality of optoelectronic transducers arrayed on a straight line.

The correction means preferably corrects the results of sensing from each of the plurality of sensing means based upon inclination of second sensing means relative to first sensing means among the plurality of sensing means.

The correction means preferably corrects the results of sensing from each of the plurality of sensing means based upon a magnification, which is for calculating coordinates, set for each of the plurality of sensing means.

According to the present invention, the foregoing object is attained by providing a coordinate input method in which light from a designating tool is applied to a prescribed position on a coordinate input screen to produce a beam spot and coordinates corresponding to the beam spot are generated, the apparatus comprising: a correction step of correcting results of sensing from each of a plurality of sensing units provided in the vicinity of at least one coordinate axis for sensing the beam spot; a concatenation step of concatenating data that has been corrected at the correction step; and an output step of outputting coordinate values corresponding to the beam spot based upon the data concatenated at the concatenation step; wherein light-receptive areas of the plurality of sensing units have overlapping portions.

According to the present invention, the foregoing object is attained by providing a computer-readable memory storing coordinate-input program code, in which light from a designating tool is applied to a prescribed position on a coordinate input screen to produce a beam spot and coordinates corresponding to the beam spot are generated, said program code comprising: program code of a correction step of correcting results of sensing from each of a plurality of sensing units provided in the vicinity of at least one coordinate axis for sensing the beam spot; program code of a concatenation step of concatenating data that has been corrected at the correction step; and program code of an output step of outputting coordinate values corresponding to the beam spot based upon the data concatenated at the concatenation step; wherein light-receptive areas of the plurality of sensing units have overlapping portions.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

FIG. 3 is a diagram illustrating the operating mode of the designating tool according to the first embodiment;

DESCRIPTION OF THE PREFERRED EMBODIMENT

A preferred embodiment of the present invention will now be described in detail with reference to the drawings.

The general construction of an optical coordinate input apparatus according to the present invention will be described with reference to FIG. 1.

Figure 1:
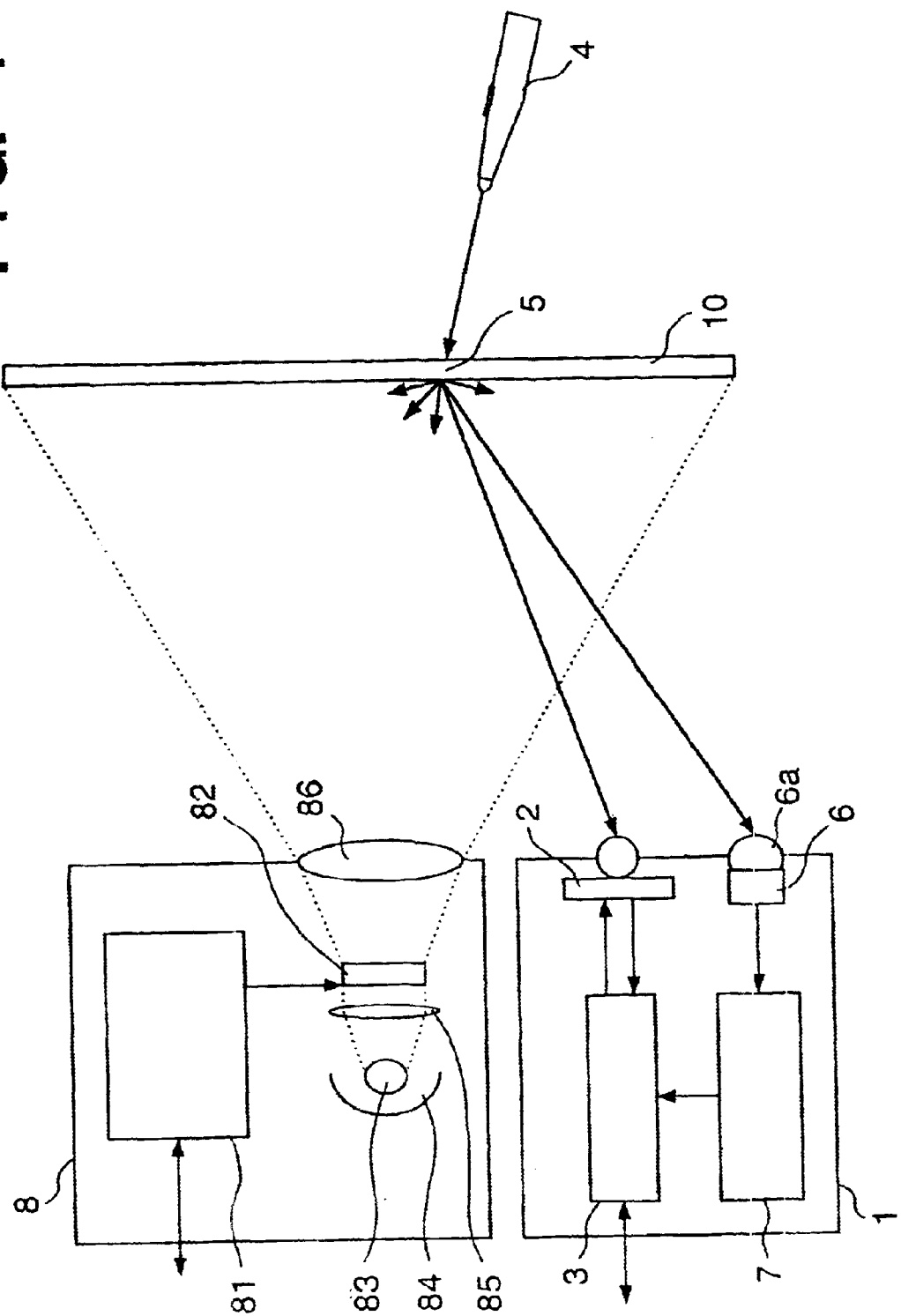
FIG. 1 is a diagram schematically illustrating the construction of a coordinate input apparatus according to an embodiment of the present invention.

FIG. 1 is a diagram schematically illustrating the construction of a coordinate input apparatus according to an embodiment of the present invention.

Broadly speaking, the coordinate input apparatus comprises a designating tool 4 for forming a beam spot 5 on a screen 10 serving as a coordinate input surface, and a coordinate detector 1 for detecting the coordinates of the position of a beam spot 5 on the screen 10. FIG. 1 illustrates a projection-type display unit 8 which, in combination with these components, serves as an output device for displaying an image or positional coordinates on the screen 10.

The coordinate detector 1 includes a coordinate sensing unit 2, a controller 3 for controlling the coordinate sensing unit 2 and calculating coordinates, a photoreceptor 6 and a signal processor 7. The coordinate detector 1 is adapted to detect the coordinates of the beam spot 5 on the screen 10 and control signals corresponding to various states (described later) of the designating tool 4, and to transmit this information to an externally connected unit (not shown) by the controller 3.

The projection-type display unit 8 comprises an image signal processor 81 to which is input an image signal from a display signal source constituted by an externally connected device such as a host computer (not shown), a liquid crystal display panel 82 controlled by the processor 81, an illuminating optical system comprising a lamp 83, a mirror 84 and a condenser 85, and a projecting lens 86 for projecting the image of the liquid crystal panel 82 onto the screen 10, whereby desired information can be displayed on the screen 10. The latter has a suitable light diffusing property in order to broaden the range over which the projected image can be observed. As a result, the light beam emitted from the designating tool 4 also is diffused at the position of the beam spot 5 so that some of the light diffused at the position of the beam spot 5 will impinge upon the coordinate detector 1 regardless of the position on the screen and the direction of the light beam.

By virtue of this arrangement, character information or line-drawing information is input on the screen 10 by the designating tool 4 and this information is displayed by the projection-type display unit 8, whereby it is possible to input or output information just as if a pencil and paper were being used. In addition, a button operation or an input operation such as selection of an icon can be performed freely.

Detailed Description of Designating Tool 4

Figure 2:
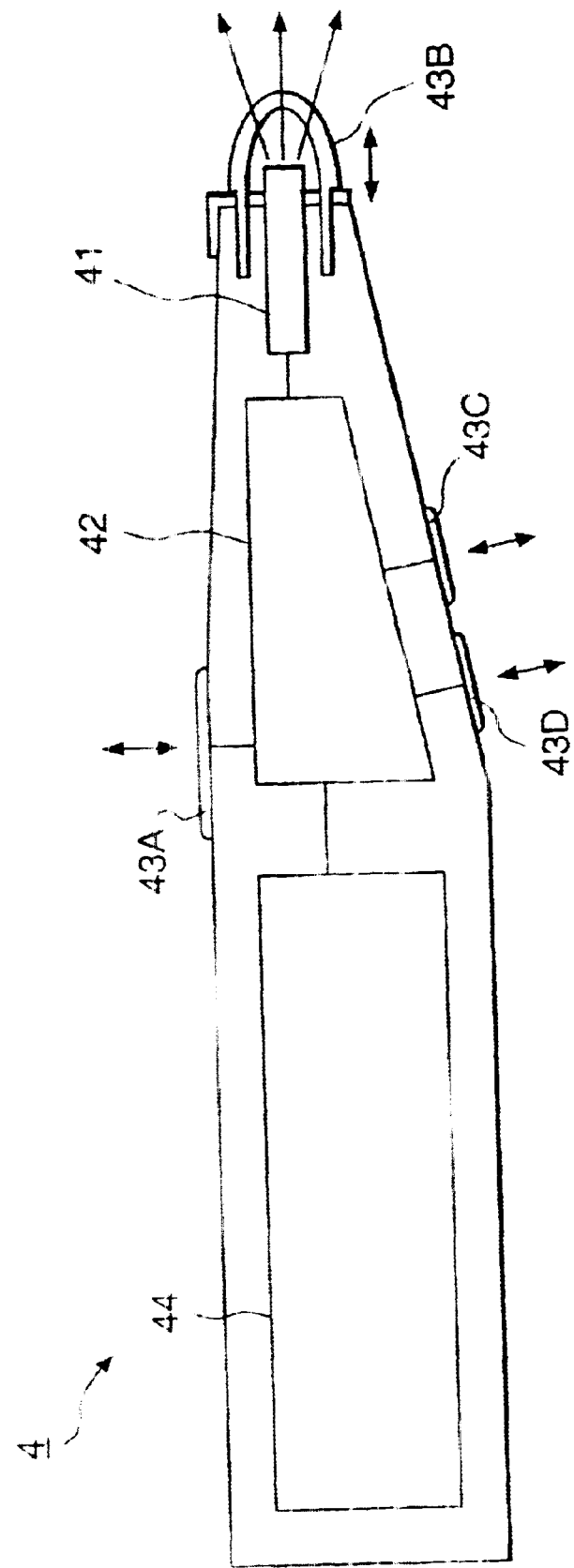
FIG. 2 is a diagram illustrating the detailed construction of a designating tool according to the embodiment.

FIG. 2 is a diagram illustrating the details of the designating tool 4 according to this embodiment.

As shown in FIG. 2, the designating tool 4 is internally provided with a light-emitting element 41 such as a semiconductor laser for emitting a light beam or an LED for emitting infrared light, a light-emission controller 42 for driving and controlling the light emission, a power supply unit 44 such as a battery. operating switches 43A to 43D, and a removable cap 46 consisting of a transparent member for covering the light-emitting element 41. The light-emission controller 42 performs light-emission control, in which control signals are superimposed, by turning the light emission on and off depending upon the states of the operating switches 43A to 43D and a modulating method described later.

FIG. 3 illustrates the operating modes of the designating tool 4 according to this embodiment.

Switches A to D correspond to the switches 43A to 43D, respectively, of FIG. 2. In FIG. 3, "light emission" corresponds to a light-emission signal (coordinate signal), and "pen down" and "pen button" correspond to control signals.

The operator grasps the designating tool 4 and points its tip toward the screen 10. The switch 43A is placed at a position where it will be contacted naturally by the operator's thumb. Pressing the switch 43A causes the emission of a light beam 45. As a result, the beam spot 5 is produced on the screen 10 and a coordinate signal starts being output by predetermined processing. In this state, however, the pen-down and pen-button control signals are OFF. As a consequence, only an indication of a designated position is presented to the operator as by motion of a cursor or a changeover in the highlighting of a button, etc.

By pressing the switches 43C and 43D, which are placed at positions contacted naturally by the operator's index and middle fingers, the pen-down and pen-button control signals become signals superimposed upon the light-emission signal, as indicated in FIG. 3. In other words, pressing the switch 43C establishes the pen-down state, thereby making it possible to execute screen control such as the start of a character or line-drawing input or the selection of a button.

Pressing the switch 43D establishes the pen-button state, in which it is possible to accommodate other functions such as the calling of a menu. As a result, by using only one hand, the operator can immediately write a character or figure correctly at any position on the screen 10 or can select a button or menu. Thus, the designating tool 4 can be operated nimbly.

The tip of the designation tool 4 is provided with the cap 46 which works as the switch 43B by pressing the tip of cap 46. In the preferred embodiment, since the switch 43B identifies with the cap 46, the switch 43B is only shown in FIG. 2. The operator grasps the designating tool 4 and presses its tip against the screen, thereby establishing the pen-down state. Thus, a natural pen input operation can be performed without needless operation of buttons.

The switch 43A has a pen-button function. Of course, if the switch 43A is pressed without pressing the designating tool 4 against the screen, it is possible to move only the cursor. In actuality, rather than performing input of a character or figure at a distance from the screen, somewhat better operability and accuracy are obtained by pressing the designating tool 4 directly against the screen. In this embodiment, a natural, nimble operation thus is possible at a distance from the screen or immediately in front of the screen using the four switches, and the designating tool 4 can be used properly in accordance with the particular case. Furthermore, in case of direct input only (wherein the designating tool 4 is not used as a pointer), a diffuse light source will be satisfactory and a light beam will not be required. In such case it is possible to use an LED, which is less expensive than a semiconductor laser and longer in life.

Further, the light-emission controller 42 set so as to transmit a unique ID number together with a control signal in order to deal with a case where two types of designating tools 4, one for up-close work and one for remote work, are used or are operated by two or more people simultaneously, or in a case where use is made of a plurality of designating tools 4 having different attributes such as color and thickness of a drawn line. The attributes such as the color and thickness of a drawn line are decided by software on the side of the externally connected device in association with the transmitted ID number, and a button or menu on the screen 10 can be set and changed. This operation may be performed by providing the designating tool 4 with a separate operating button and transmitting a command signal to effect the change. With regard to these settings, the particular state can be retained within the designating tool 4 or within the coordinate detector 1 and the attribute information can be transmitted to the externally connected device without use of an ID number.

Such an additional operating button makes possible the setting of other functions. For example, it is possible to turn the display unit on and off, to changeover the signal source or to operate a recording device or the like. Furthermore, it is possible to transmit a variety of useful signals. For example, by providing one or both of the switches 43A, 43B with pressure detecting means, writing pressure can be detected and the writing-pressure data can be transmitted together with a control signal.

If the switch 43A or 43B of the designating tool 4 is turned on, emission of light starts and the light-emission signal is output. Output first is a header comprising a leader, which consists of a comparatively long sequence of successive pulses, and a code (maker ID, etc.) that follows the leader. Next, a transmission data sequence, which comprises the pen ID and control signals, etc., is output successively in accordance with a sequence and format defined in advance (see signal LSG in FIG. 5).

In this embodiment, the modulation format is such that the "1" bits of the data bits have twice the intervals of the "0" bits, though various data encoding schemes can be used. However, that the average amount of light be fixed is desirable in order to detect coordinates, as will be described later, and that the clock component be sufficiently large is desirable in order to tune a PLL. In addition, in view of the amount of data to be transmitted, there is no harm in providing a comparatively high degree of redundancy. Taking these facts into consideration, this embodiment performs encoding through a method wherein 6-bit (64 items of) data is assigned to 108 codes in which the numbers of "1"s and "0"s are the same and the number of consecutive bits which are "1"s or "0"s is three or less in a code having a length of ten bits. By adopting such an encoding scheme, average power is rendered constant and a satisfactory clock component is included. This makes it possible to readily generate a stable synchronizing signal at the time of demodulation.

As mentioned above, the pen-down and pen-button control signals are two-bit signals. However, other items of long data such as an ID must also be transmitted. Accordingly, in this embodiment, 24 bits are adopted as one block, in which the two leading bits are for the control signal, the next two bits are for an internal identification code (e.g., "00" represents the writing pressure signal and "11" the ID), the next two bits are for the related parity check, the next 16 bits represent data and the final two bits are for the related parity check. If this data is encoded by the scheme described above, a signal having a length of 40 bits will be obtained. A 10-bit sync code is added onto the beginning of this signal. The sync code uses a special code, namely a code composed of five successive "0"s and five successive "1"s or a pattern that is the inverse thereof (the changeover being made depending upon whether the end of the immediately preceding block is "1" or "0"). This makes it possible to readily distinguish between this code and a data word. In addition, a position even along a data string can be identified with certainty so that the data can be reconstructed. In one block, therefore, a transmission signal having a length of 50 bits is obtained, and a control signal and 16-bit data such as an ID or writing pressure are transmitted.

In this embodiment, 7.5 kHz, which is ⅛ of a first frequency of 60 kHz, is adopted as a second frequency. However, since the above-mentioned encoding scheme is adopted, the average transmission bit rate is ⅔ of the first frequency, or 5 kHz. Since one block is 50 bits, 24-bit data of one block is transmitted at a frequency of 100 Hz. Accordingly, the effective bit rate exclusive of parity is 2000 BPS. Thus, though redundancy is high, erroneous detection is prevented and synchronization is achieved with ease. This can be realized through a very simple arrangement. Further, by making joint use of a phase synchronizing signal for sensor control, described later, and a check of the repetitive period of the sync code, follow-up can be performed even in a case where a signal develops short drop-out. Conversely, a case in which a quick operation such as pen-up or double-tap has been performed can be identified reliably depending upon whether or not there is a header signal.

Detailed Description of Coordinate Detector 1

Figure 4:
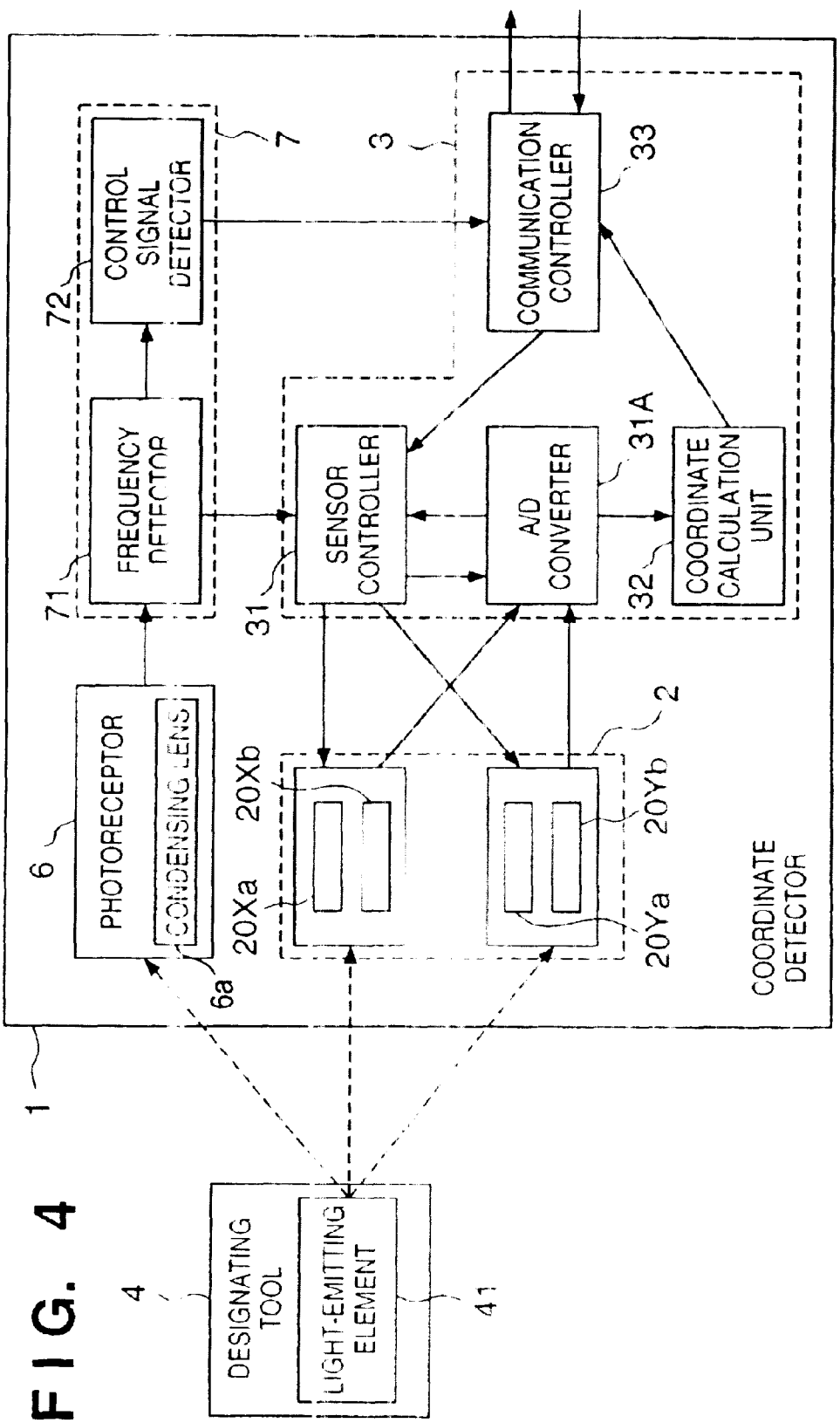
FIG. 4 is a diagram illustrating the detailed construction of a coordinate detector according to the embodiment.

FIG. 4 is a diagram the details of the coordinate detector 1 according to this embodiment.

The coordinate detector 1 is provided with the photoreceptor 6 for high-sensitivity detection of amount of light by a condensing optical system, and with four linear sensors 20Xa, 20Xb, 20Ya, 20Yb for detecting direction of arriving light by an image-forming optical system. Each of these receives diffused light from the beam spot 5 produced on the screen 10 by the light beam from the light-emitting element 41 built in the designating tool 4.

Description of Operation of Condensing Optical System

A condensing lens 6a serving as a condensing optical system is mounted on the photoreceptor 6 for sensing, with a high sensitivity, the amount of light of a certain wavelength from the entire area of the screen 10. The output of the condensing lens 6a is detected by a frequency detector 71, after which the detected signal is demodulated by a control signal detector 72 to a digital signal which includes the data of a control signal (a signal superimposed by the light-emission controller 42 of the designating tool 4), etc.

A timing chart of the operation for restoring the control signal will now be described.

Figure 5:
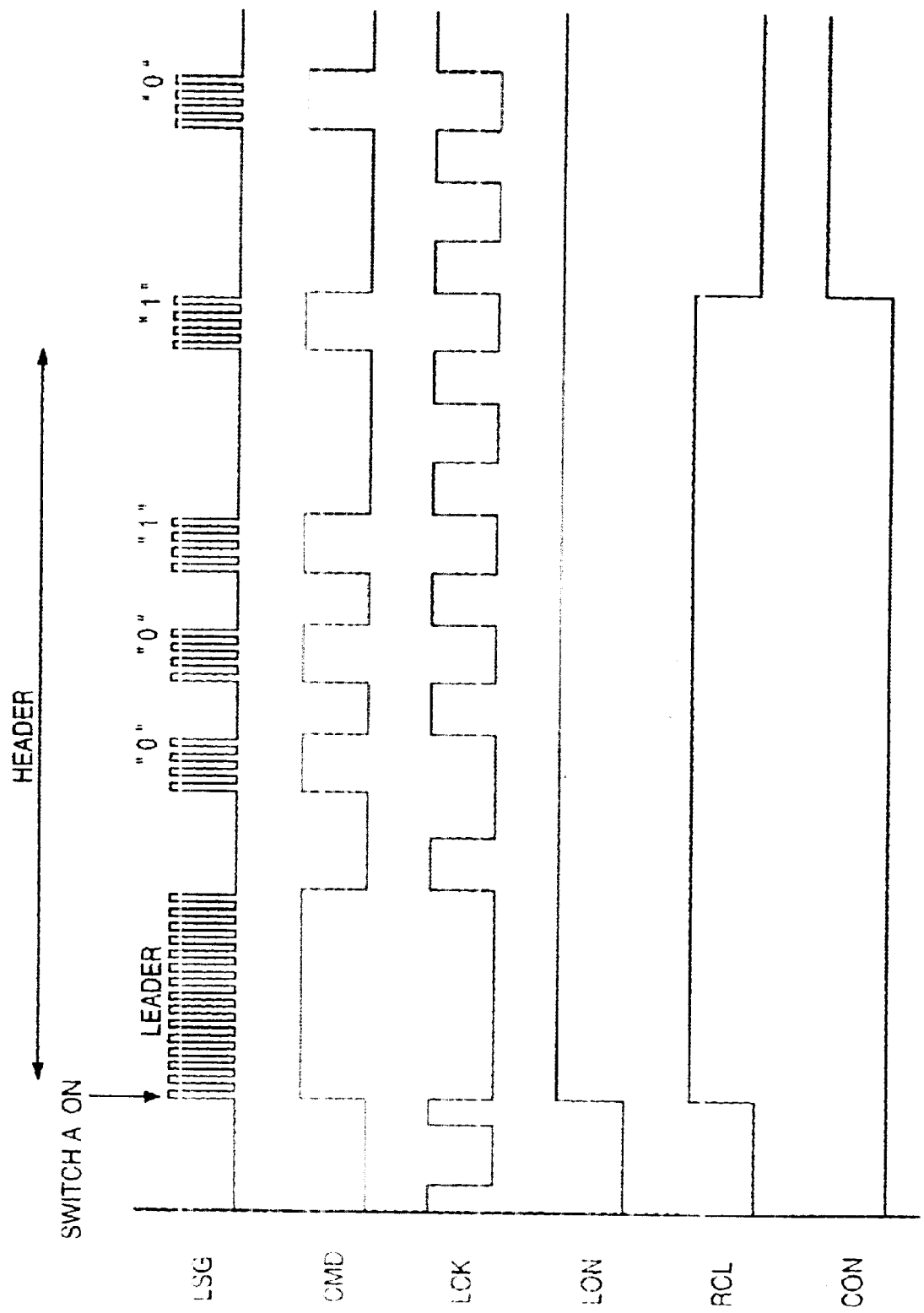
FIG. 5 is a timing chart illustrating restoration of a control signal according to the embodiment.

FIG. 5 is a timing chart illustrating restoration of a control signal according to this embodiment.

The data signal comprising the bit sequence described above is sensed as an optical output signal LSG by the photoreceptor 6 and this signal is detected by the frequency detector 71. The latter is adapted so as to be tuned to the pulse cycle of the first frequency, which is the highest in the optical output signal LSG. By making joint use of an optical filter, a modulated signal CMD is demodulated without being affected by extraneous light. The detection method is similar to that of an infrared remote controller that is in wide use and is a highly reliable wireless communication method.

In this embodiment, a frequency of 60 kHz, which is higher than that of the generally employed infrared remote controller, is used as the first frequency, so that erroneous operation will not occur even if the apparatus is used at the same time. However, it is possible to place the first frequency in a band the same as that of the generally employed infrared remote controller, in which case erroneous operation would be prevented by identification based upon an ID or the like.

The modulated signal CMD detected by the frequency detector 71 is interpreted as digital data by the control signal detector 72, and a control signal such as pen-down or pen button is restored. The restored control signal is sent to a communication controller 33. The period of code modulation of the second frequency included in the modulated signal CMD is detected by the a sensor controller 31, and the linear sensors 20X, 20Y are controlled by this signal. That is, the sensor controller 31 is reset at the timing of the header shown in FIG. 5, after which a signal LCK phase-synchronized to the falling edge of the modulated signal CMD is generated.

Accordingly, the generated signal LCK is a signal of a fixed frequency synchronized to the absence or presence of a light emission from the designating tool 4. Further, a signal LON indicating whether or not there is a light input and a sensor-reset signal RCL activated by the signal LON are generated from the modulated signal CMD. The two linear sensors 20X, 20Y are reset while the sensor reset signal RCL is at the high level, and a synchronous integration operation, described later, starts at the timing of the falling edge of the sensor reset signal RCL, which is synchronized to the rising edge of the signal LCK.

If the control signal detector 72 detects the header and confirms that input from the designating tool 4 has started and that this is not noise or an input from another device, a signal indicative of this confirmation is sent from the communication controller 33 to the sensor controller 31, a signal CON indicating that operation of the linear sensors 20Xa, 20Xb, 20Ya, 20Yb is valid is set to the high level and operation of a coordinate calculation unit 32 begins.

Figure 6:
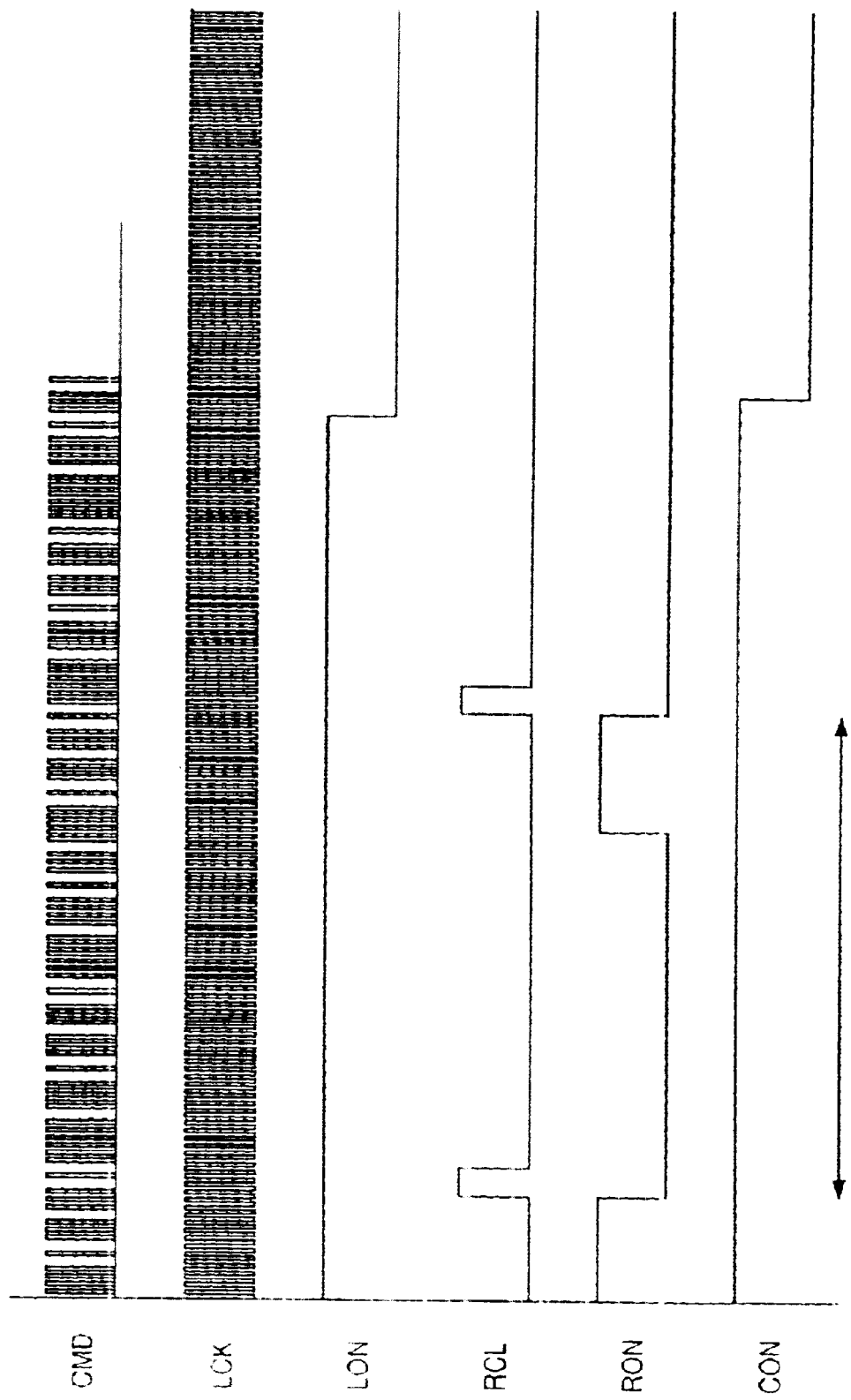
FIG. 6 is a timing chart illustrating signals handled according to the embodiment.

FIG. 6 is a timing chart for when the optical output signal LSG vanishes and a series of operations ends. If the modulated signal CMD detected from the optical output signal LSG continues at the low level for a fixed period of time or greater, the signal LON indicating whether an optical input is present or not falls to the low level and so does the signal CON indicating that sensor operation is valid. As a result, the coordinate output operation by the linear sensors 20Xa, 20Xb, 20Ya, 20Yb is terminated.

Description of Operation of Image-forming Optical System

Figure 7:
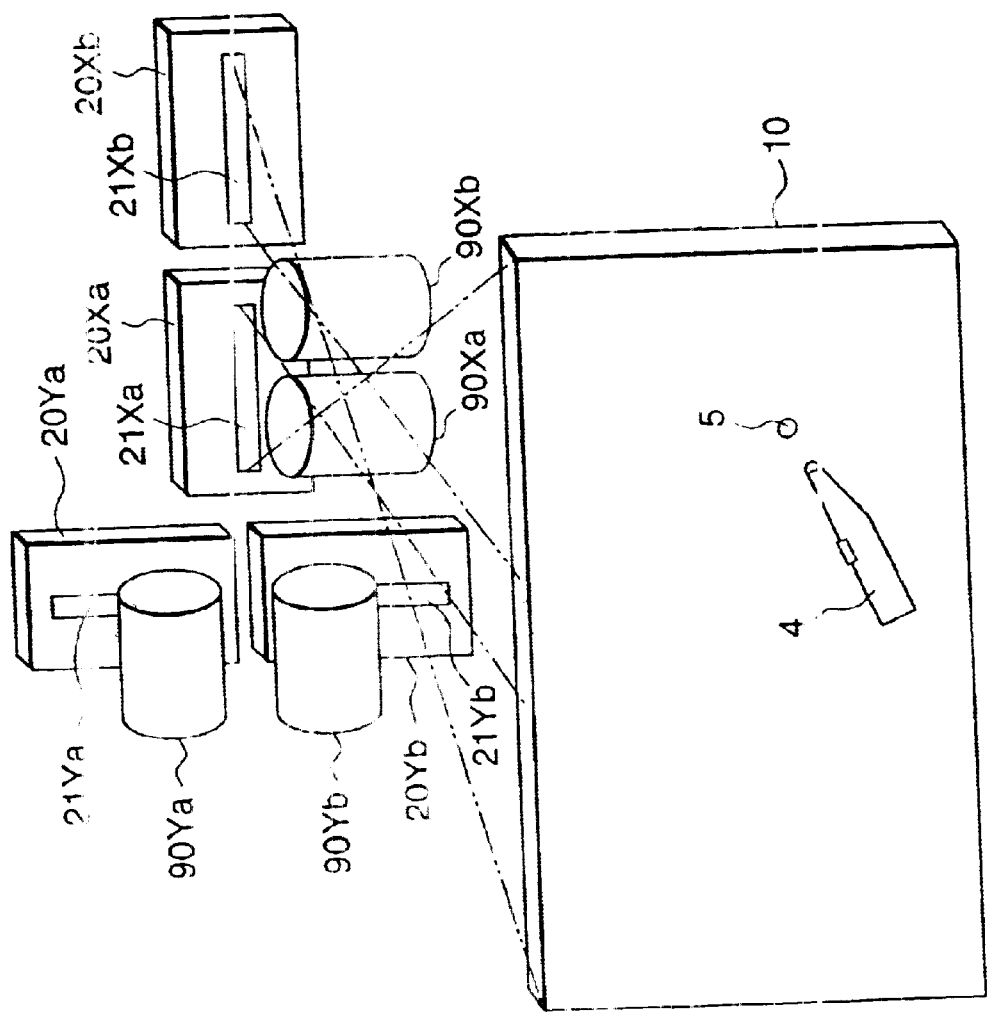
FIG. 7 is a diagram showing the positional relationship of linear sensors 20X$a$, 20X$b$, 20Y$a$, 20Y$b$ according to the embodiment.

FIG. 7 is a diagram showing the positional relationship of the linear sensors 20Xa, 20Xb, 20Ya, 20Yb.

The image of the beam spot 5 is formed in the shape of a line on each of photosensitive portions 21Xa, 21Xb, 21Ya, 21Yb of respective ones of the linear sensors 20Xa, 20Xb, 20Ya, 20Yb by cylindrical lenses 90Xa, 90Xb, 90Ya, 90Yb, respectively, serving as the image-forming optical system. By disposing the linear sensors 20Xa, 20Xb exactly at right angles with respect to the linear sensors 20Ya, 20Yb, the sensors produce outputs having peaks at the pixels which reflect the X and Y coordinates, respectively, of the beam spot.

The linear sensors 20Xa, 20Xb, 20Ya, 20Yb are controlled by the sensor controller 31 and the output signals of the sensors are sent to the coordinate calculation unit 32 as digital signals by an A/D converter 31A. The coordinate calculation unit 32 calculates the output coordinates from the input digital signals and sends the result of calculation to an external control unit (not shown) by a predetermined communication method via the communication controller 33 together with data such as the control signal from the control signal detector 72. In a case where an operation (e.g., setting of a calibration value by a user) different from that of the usual operation is performed, as when an adjustment is carried out, the communication controller 33 sends a mode changeover signal to the sensor controller 31 and coordinate calculation unit 32.

According to the present invention, blurring is produced intentionally using focusing or a light diffusing film in such a manner that the image of the beam spot 5 will take on an image width that is several times the pixels of the linear sensors 20X, 20Y. Thus, the light diffusing plate produces blurring intentionally. In accordance with an experiment in which use was made of plastic cylindrical lenses having a diameter of 1.5 mm, an effective 64-pixel linear CCD having a pixel pitch of about 15 $\mu$m and an infrared LED, it was found that if the image is formed to maximum sharpness, an image width of less than 15 $\mu$m is obtained over the entirety of a field angle of about 40°. It was found that trace drawn by the result of pixel-to-pixel partitioning calculation was distorted in stepwise fashion under these conditions. Accordingly, very smooth coordinate data was obtained when the position of the lens was adjusted so as to provide an image width of 30 to 60 $\mu$m. Of course, if blurring is made excessive, the peak level will decline. An image width on the order of several pixels, therefore, is best. One characterizing feature of the present invention is to use a CCD having a small number of pixels and an optical system which furnishes a suitable amount of blurring. By using such a combination, it is possible to realize an inexpensive coordinate input apparatus in which the amount of calculation data is small and with which a very high resolution, high precision and high speed can be obtained using a small sensor and optical system.

The linear sensors 20Xa, 20Xb for sensing X coordinates and the linear sensors 20Ya, 20Yb for sensing Y coordinates, which are disposed in the form of an array, are identical in construction. The details of this construction will be described with reference to FIG. 8.

Figure 8:
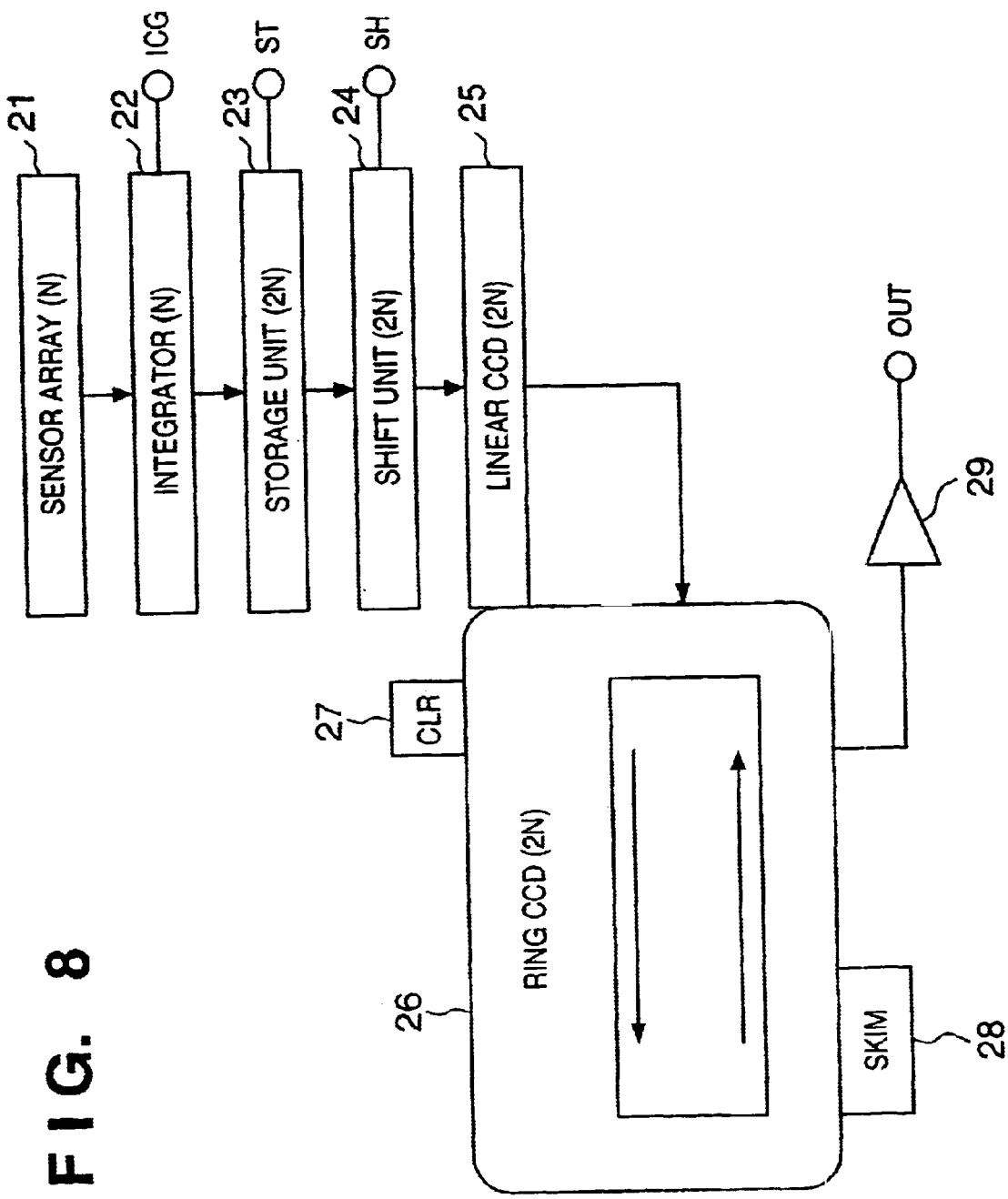
FIG. 8 is a diagram illustrating the detailed construction of a linear sensor according to the embodiment.

FIG. 8 is a diagram illustrating the detailed construction of a linear sensor according to this embodiment.

A sensor array 21 which is the photoreceptor unit comprises N-number of pixels (64 in this embodiment). Electric charge conforming to the amount of received light is stored in an integrator 22. The integrator 22, which comprises 64 integrators, can be reset by applying a voltage to a gate ICG. This makes possible an electronic shutter operation. The electric charge that accumulated in the integrator 22 is transferred to a storage unit 23 by applying a pulsed voltage to an electrode ST. The storage unit 23 comprises two storage units which separately and respectively store electric charge in conformity with H and L levels of an IRCLK signal synchronized to the light-emission timing of the designating tool 4. Thereafter, in sync with the turning on and off of the light, the electric charge that has been separately stored is transferred to a linear CCD unit 25, which comprises two CCDs, via a shift unit 24, which comprises two shifters, provided in order to simplify the transfer clock.

As a result, electric charge corresponding to the turning on and off of the light output from the sensor of N-number of pixels is stored as a row of contiguous charge. The electric charge arrayed in the CCD unit 25 is transferred successively to a ring CCD 26 comprising two CCDs. After the ring CCD 26 is emptied by a CLR unit 27 in response to a CLR signal, electric charge from the linear CCD unit 25 is stored successively.

The electric charge thus stored is read out by an amplifier 29. The latter outputs non-destructively a voltage proportional to the amount of stored charge. In actuality, the difference between mutually adjacent amounts of charge, namely a value obtained by subtracting amount of charge in the absence of a light emission from amount of charge at emission of light from the light-emitting element 41, is amplified and output.

An example of the output waveforms obtained from the linear sensors 20Xa, 20Xb, 20Ya, 20Yb at this time will be described with reference to FIG. 9.

Figure 9:
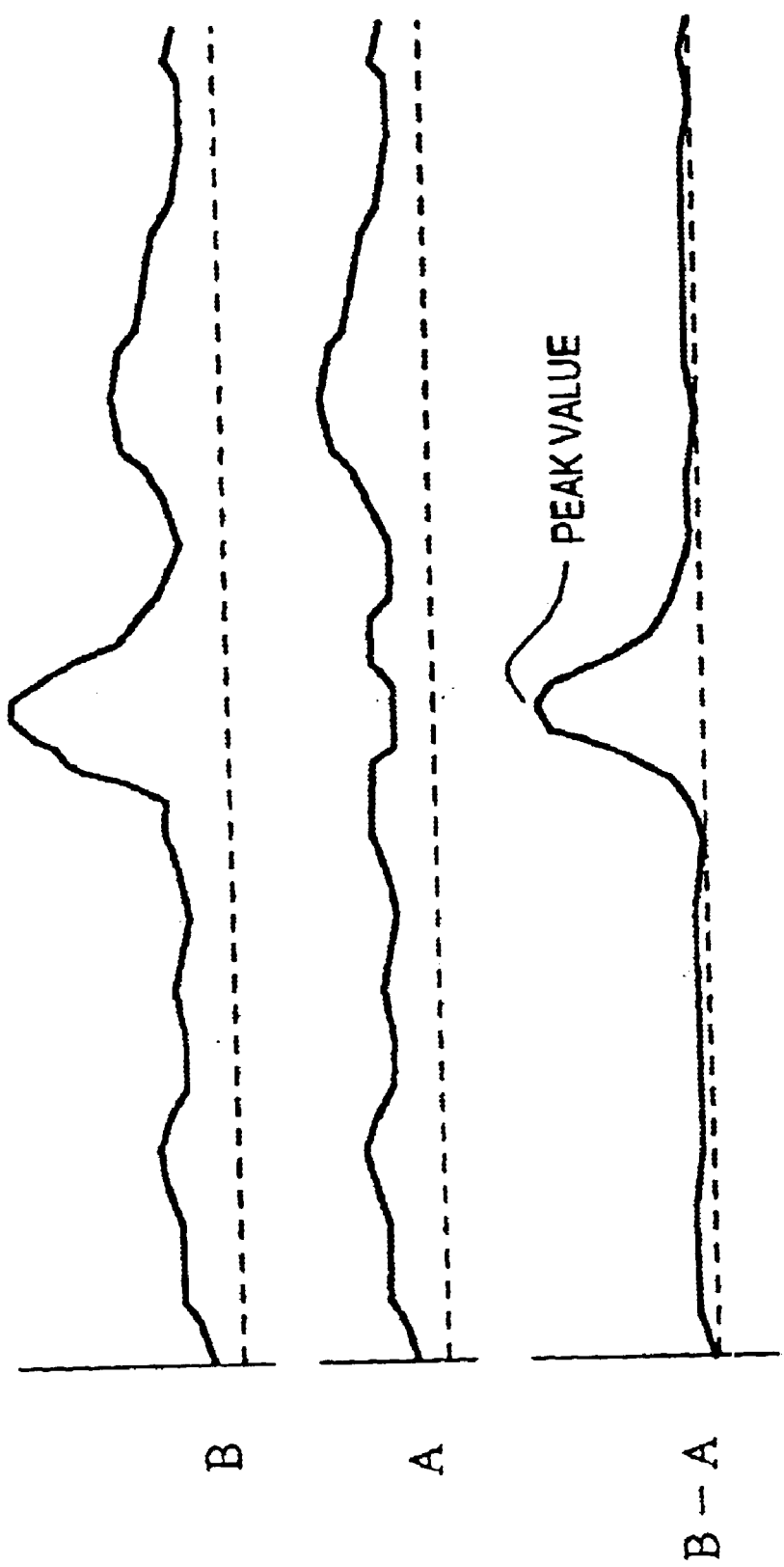
FIG. 9 is a diagram illustrating an example of output waveforms of the linear sensors according to the embodiment.

FIG. 9 is a diagram illustrating an example of output waveforms of the linear sensor according to this embodiment.

Waveform B in FIG. 9 is obtained when only a signal prevailing at the time of light emission from the light-emitting element 41 is read out, and waveform A is that in the absence of a light emission, i.e., a waveform which represents only extraneous light. (As shown in FIG. 8, the electric charge of pixels corresponding to the waveforms A and B is arrayed in contiguous fashion in the ring CCD 26.) The amplifier 29 non-destructively amplifies and outputs the difference (waveform B–waveform A) between the neighboring amounts of charge. As a result, a signal representing an image which is solely light from the designating tool 4 can be obtained and a stable coordinate input is possible without the effects of extraneous light (noise).

Let the maximum value of the difference B–A between the waveforms shown in FIG. 9 be defined as the peak value. If the storage time during which each of the linear sensors of linear sensors 20Xa, 20Xb, 20Ya, 20Yb functions with respect to the light is lengthened, the peak value increases in conformity with this time. In other words, if the time of one period of the IRCLK signal is adopted as unit charging time and number n of times storage is performed is defined using this time as the unit, the peak value will be enlarged by increasing the number n of times storage is performed. By detecting that the peak value has attained a predetermined threshold value TH1, it is possible to obtain an output waveform having a constant quality at all times.

Figure 10:
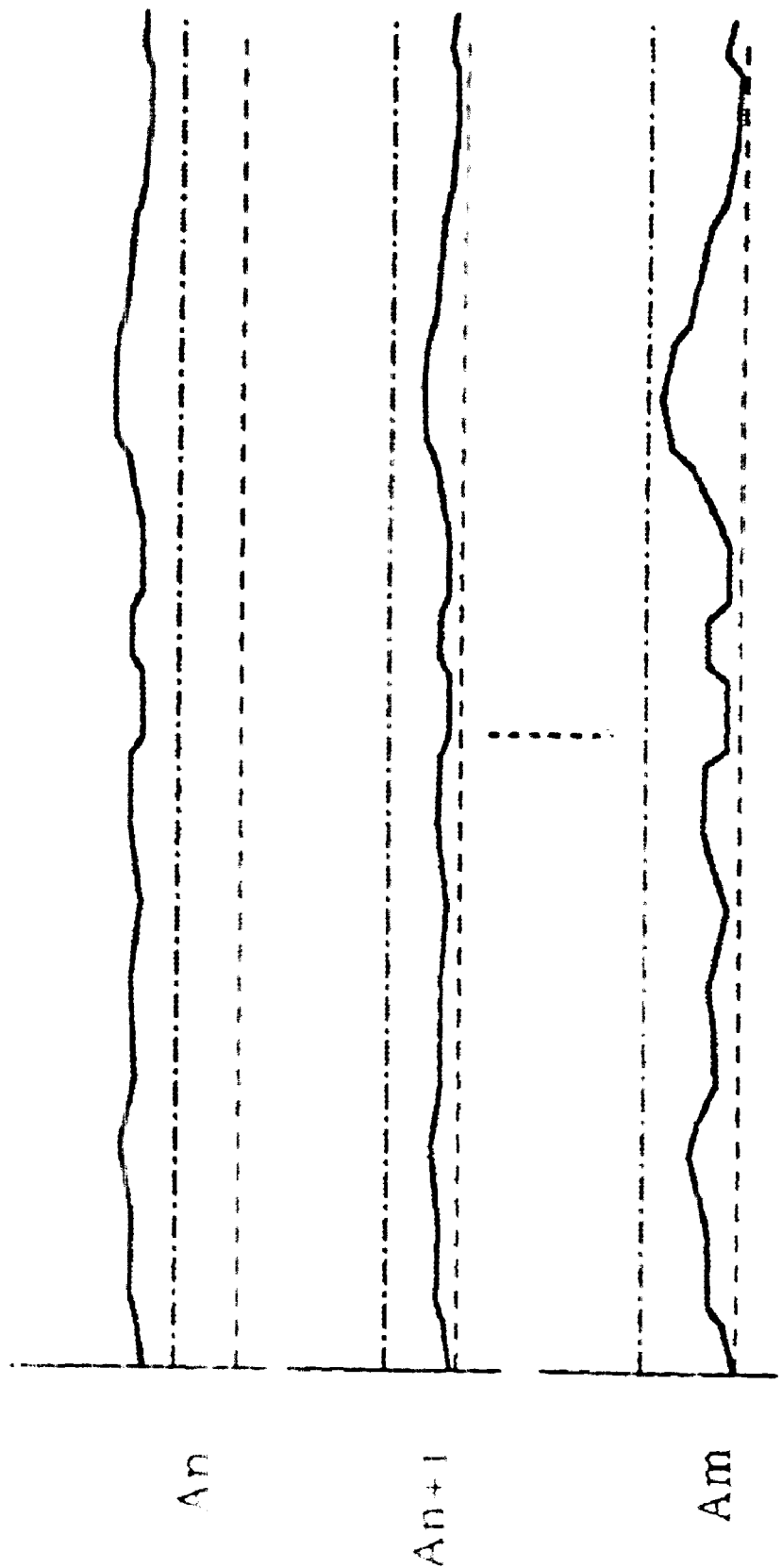
FIG. 10 is a diagram illustrating an example of an output waveform for describing a skimming operation of the linear sensor according to the embodiment.

In a case where the extraneous light is very intense, there is the danger that the transfer charge of the ring CCD 26 will saturate before the peak of the difference B–A between the waveforms will become sufficiently large. In consideration of such a case, each of the linear sensors of linear sensors 20Xa, 20Xb, 20Ya, 20Yb is provided with a SKIM unit 28 having a skim function. The SKIM unit 28 monitors the level of the signal which prevails in the absence of a light emission. When the signal level of a waveform indicated An exceeds a predetermined value (see the one-dot chain line in FIG. 10) at an nth charge in FIG. 10, a fixed amount of charge is extracted from each pixel of A and B. As a result, a waveform indicated at An+1 is obtained at the next (n+1)th charge. By repeating this operation, saturation will not occur and storage of signal change can continue even if extraneous light is very intense.

Accordingly, even if the amount of light from the designating tool 4 when the light from latter is turned on and off is very small, a sufficiently large signal waveform can be obtained by continuing the integrating operation a number of times. In particular, since the signal of a displayed image is superimposed in a case where a light-emitting source of the visible light region is used for the designating tool 4, a sharp waveform containing very little noise can be obtained by using the above-described skim function and differential output.

Control of the operation of linear sensors 20Xa, 20Xb, 20Ya, 20Yb will now be described with reference to FIG. 11.

Figure 11:
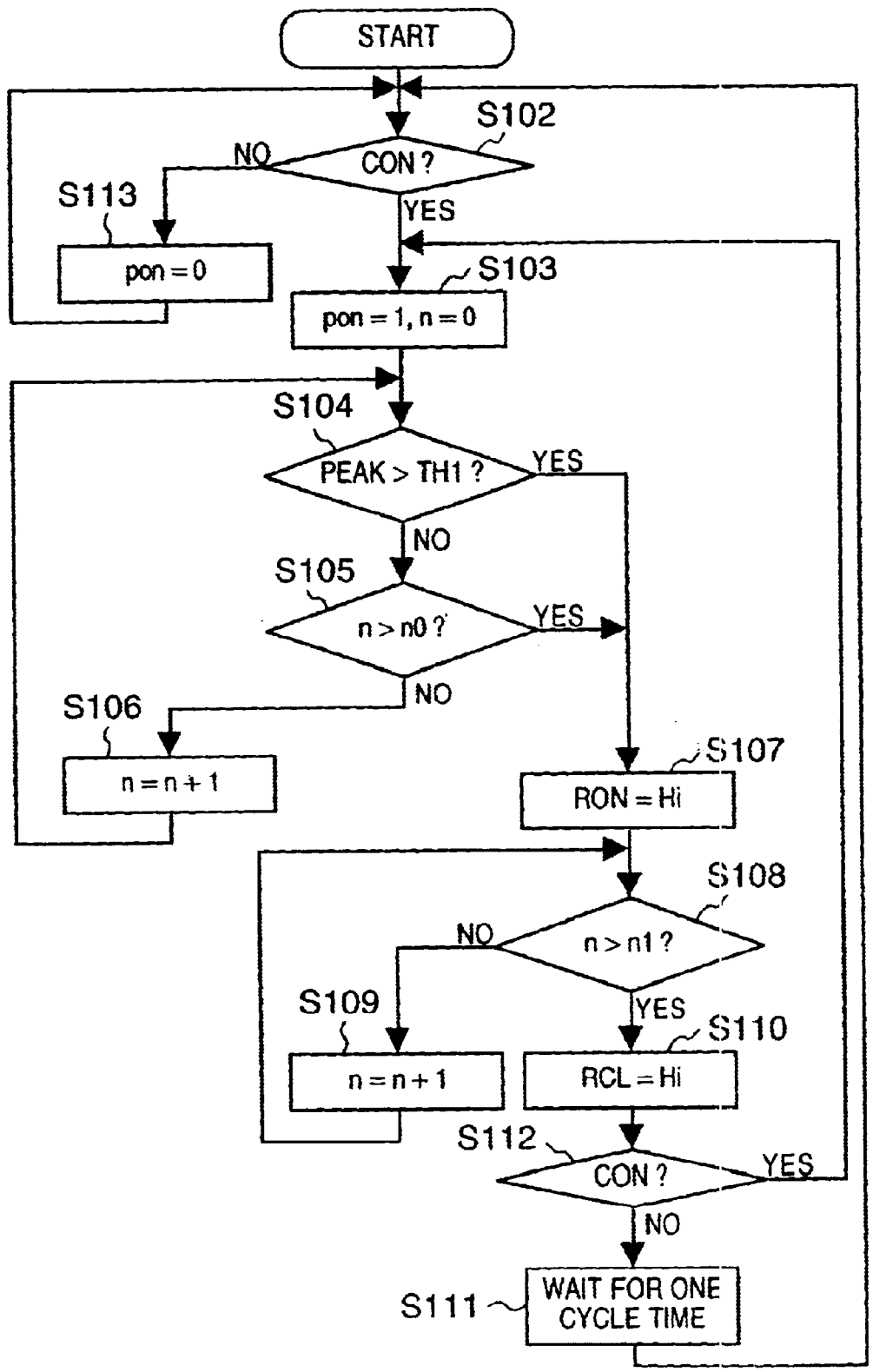
FIG. 11 is a flowchart illustrating control of operation of the linear sensors according to the embodiment.

FIG. 11 is a flowchart illustrating control of operation of the linear sensors according to this embodiment.

When the sensor controller 31 starts sensor control, the controller monitors the signal CON at step S102. If the signal CON is at the high level ("YES" at step S102), control proceeds to step S103 and the number n of integrating operations is reset to zero. Next, at step S104, the controller determines whether the peak value (peak level) of the sensor output is greater than the predetermined threshold value TH1.

If the peak value is equal to or less than the predetermined threshold value TH1 ("NO" at step S104), the controller 31 determines whether the number n of integrating operations is greater than a first predetermined number n0. If the number n of integrating operations is equal to or less than the first predetermined number n0 ("NO" at step S105), control proceeds to step S106. Here the number n of integrating operations is incremented and control returns to step S104. On the other hand, if the peak value is greater than the predetermined threshold value TH1 ("YES" at step S104), or if the number n of integrating operations is greater than the first predetermined number n0 ("YES" at step S105), control returns to step S107. Here an integration-stop signal RON attains the high level and the integration operation is halted.

Further, coordinate-value calculation by the coordinate calculation unit 32 starts.

This is followed by step S108, at which the sensor controller 31 determines whether the number n of integrating operations is greater than a second predetermined number n1. If the number n of integrating operations is equal to or less than the second predetermined number n1 ("NO" at step S108), control proceeds to step S109, at which the number n of integrating operations is incremented and control returns to step S108. On the other hand, if the number n of integrating operations is greater than second predetermined number n1 ("YES" at step S105), control proceeds to step S110, the integration-stop signal RON falls to the low level and, at the same time, the sensor reset signal RCL attains the high level for a length of time that is several times the cycle of the signal LCK (twice the cycle of the signal LCK in the example of FIG. 10). Next, at step S112, the sensor controller 31 monitors the signal CON. If the signal CON is at the high level ("YES" at step S112), control proceeds to step S103. On the other hand, if the signal CON is at the low level ("NO" at step S112), control returns to step S111 and the system waits for one cycle time.

In other words, this operation is repeated during the time that the signal CON is at the high level, and the calculation of coordinates is carried out every cycle decided by second predetermined number n1. The step S111 is provided so as to hold the prevailing state only one time even if the signal CON drops owing to the effects of dust or the like. If the signal CON is at the low level for two consecutive cycles ("NO" at step S102), control returns to step S113, a flag PON is reset to 0, a sync-signal standby state is attained and control returns to the initial state.

The drop-out countermeasure can be lengthened beyond one cycle. It goes without saying that if external disturbance is small, then, conversely, the drop-out countermeasure can be shortened. It should be noted that a similar operation can be performed by adopting one cycle as a natural-number multiple of the period of the data clock, making this coincide with the timing of the sync clock and using a sync-code detection signal instead of the signal CON.

Light from the designating tool 4 that reaches the coordinate detector fluctuates owing to consumption of the power supply (battery) 44 accommodated within the designating tool 4 and is also caused to fluctuate by the attitude of the designating tool 4. In particular, in a case where the screen 10 diffuses little light, the frontal brightness of the displayed image rises but the attitude of the designating tool 4 causes a greater fluctuation in the amount of light input to the sensor. According to the present invention, however, even in this case the number of times integration is performed follows up automatically and a stable output signal can be obtained at all times. This provides excellent effects in which it is possible to detect coordinates in a stable manner. In a case where light impinges upon the sensor without being scattered much when the designating tool 4 is used as a pointer, light of considerable intensity enters the sensor. However, coordinates can be detected in stable fashion even in this case.

Further, in a case where joint use is made of a pen and pointer employing an LED used upon being brought into direct contact with the screen, it is possible to use an LED that produces a greater quantity of light. Accordingly, the first predetermined number of times n0 and second predetermined number of times n1, which are the number of integrating operations shown in FIG. 11, can be switched between upon differentiating between the pen and pointer based upon the ID signal. The sampling rate is raised in the case of the pen and is lowered in the case of the pointer. In actuality, a fine writing operation such as a character input is impossible with a pointer. Better operability is obtained writing a smooth line by a low sampling rate. Providing the changeover is advantageous for this purpose.

As described above, control of the timing of the integrating operation is carried out by a demodulated signal of a prescribed period obtained by applying a high-frequency carrier to light that is turned on and off and detecting the frequency of this carrier. As a result, the designating tool and the image sensing unit can be synchronized cordlessly, thus making it possible to realize a coordinate input apparatus that is very easy to use. A further advantage is that the apparatus can be operated easily at a position remote from the screen by using a laser beam. Further, since integration control means is provided in which integration is halted in response to detection of the fact that a peak level in a difference signal from an integrating unit has exceeded a predetermined level, a signal representing a beam-spot image of a substantially constant level can be produced even if the amount of light varies. This makes it possible to obtain results of coordinate calculation that are stable and high in resolution at all times.

Calculation of Coordinate Values

Coordinate calculation processing by the coordinate calculation unit 32 will now be described.

The output signals from the four linear sensors 20X$a$, 20X$b$, 20Y$a$, 20Y$b$ (the difference signal from the amplifier 29) obtained as described above are converted to a digital signal by the A/D converter 31A provided in the sensor controller 31, and the digital signal is transmitted to the coordinate calculation unit 32, whereby coordinates are calculated. In the calculation of coordinates, first coordinates are obtained with respect to the outputs in each of the X and Y directions. This calculation processing is the same for both X and Y and therefore will be described solely with regard to the X direction.

Figure 12:
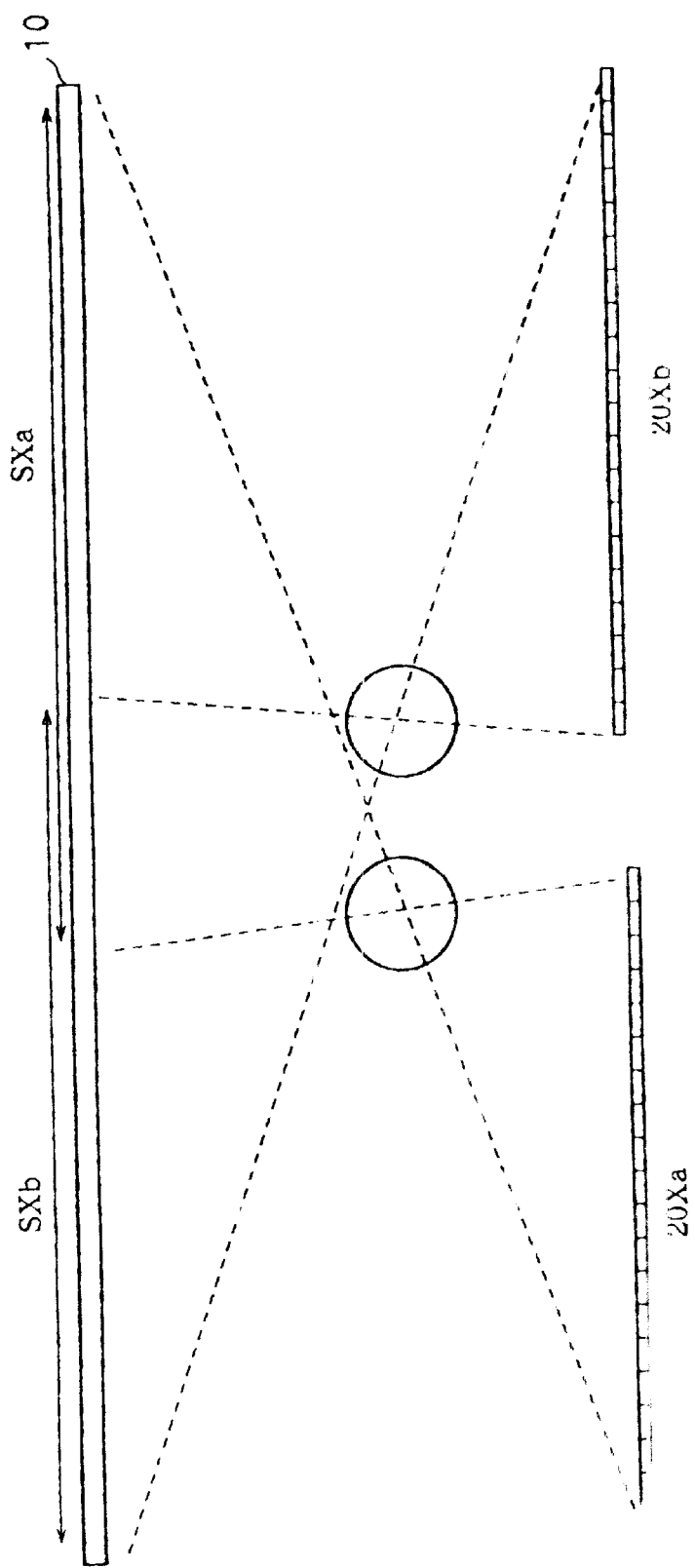
FIG. 12 is a diagram illustrating the construction of the linear sensor according to the embodiment.

As shown in FIG. 12, each of the linear sensors 20X$a$, 20X$b$ is constructed as a detection area having half the longitudinal length of the screen 10. The detection areas overlap each other in the vicinity of the center of the screen.

The linear sensor 20X$a$ senses light in a case where the beam spot resides in an area SXa of the screen 10, and the linear sensor 20X$b$ senses light in a case where the beam spot resides in an area SXb of the screen 10. Both sensors sense the beam spot in the area of overlap.

According to the present invention, coordinate values are discriminated based upon the peak values of the outputs obtained from the linear sensors 20X$a$, 20X$b$, 20Y$a$, 20Y$b$.

Figure 13:
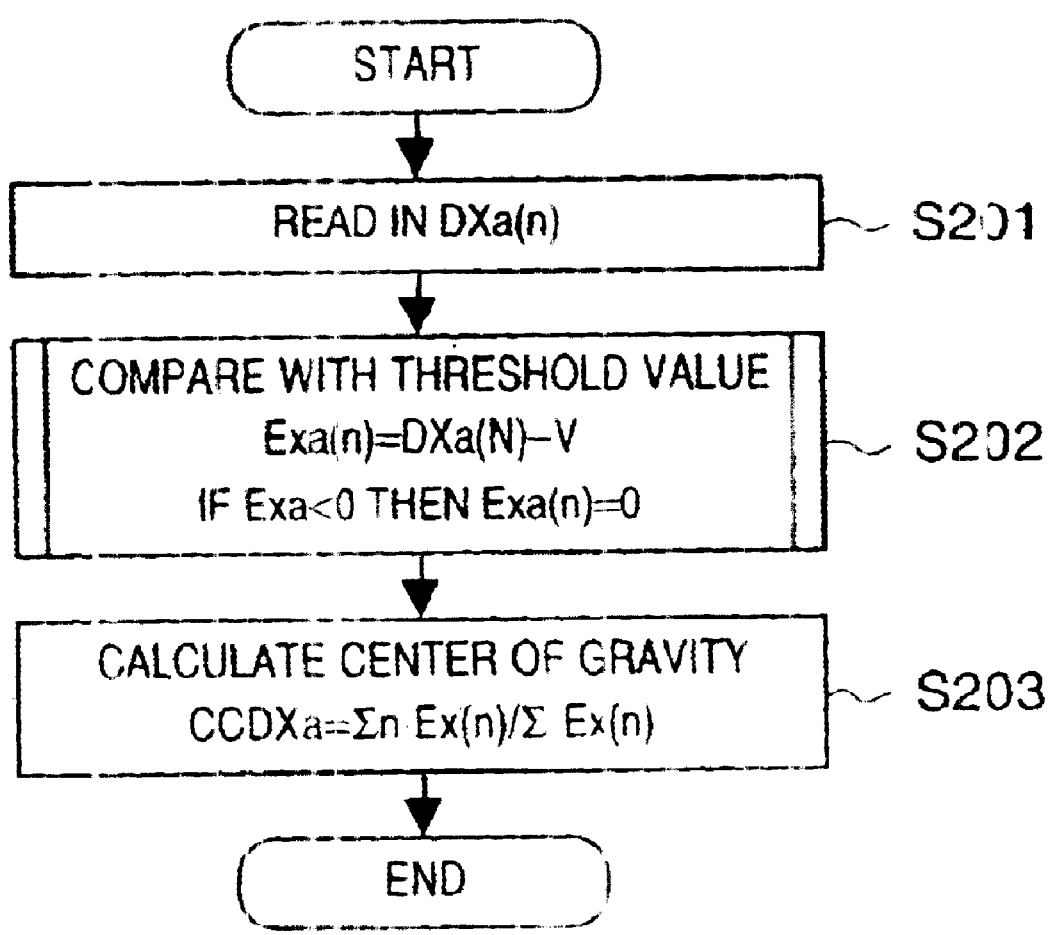
FIG. 13 is a flowchart illustrating the flow of coordinate calculation processing according to the embodiment.

Reference will be had to FIG. 13 to describe the flow of processing for calculating coordinates according to this embodiment.

FIG. 13 is a flowchart illustrating the flow of coordinate calculation processing according to this embodiment.

Let DXa, DXb represent the outputs of the ring CCDs 26 of linear sensors 20X$a$, 20X$b$, respectively. As explained earlier, these values are values obtained by an analog-to-digital conversion and therefore are voltage values that conform to the amount of sensed light for each pixel of the ring CCD 26. The peak level can be decided using the maximum value of each item of data.

Let CCDXa, CCDXb represent the coordinates sensed by the linear sensors 20X$a$, 20X$b$, respectively.

First, at step S201, difference data DXa(n) (number n of pixels in this embodiment is equal to 64) which is a difference signal regarding each pixel at an arbitrary coordinate input point is read in and stored in a buffer memory (not shown). Next, at step S202, the difference value is compared with a preset threshold value V and a data value Exa(n) greater than the threshold value is calculated. The coordinate CCDXa on the linear sensor 20Xa is calculated at step S203 using the data value Exa(n). In this embodiment, the center of gravity of the output data is calculated by the center-of-gravity method. However, it goes without saying that the present invention is not limited to this calculation method, for there is a method of finding the peak value of the data value Exa(n) by, e.g., differentiation.

The coordinate CCDXb on the linear sensor 20Xb also is calculated in a similar manner.

These calculated coordinates are coordinates which correspond to pixels on the linear CCDs 26 of the linear sensors 20Xa, 20Xb, respectively. By connecting these coordinates, therefore, they may be handled as coordinates on the linear sensors 20Xa, 20Xb.

Accordingly, we define reference coordinates for connecting coordinates corresponding to pixels on the linear CCDs 26 of the linear sensors 20Xa, 20Xb.

This definition of reference coordinates will be described using FIG. 14.

Figure 14:
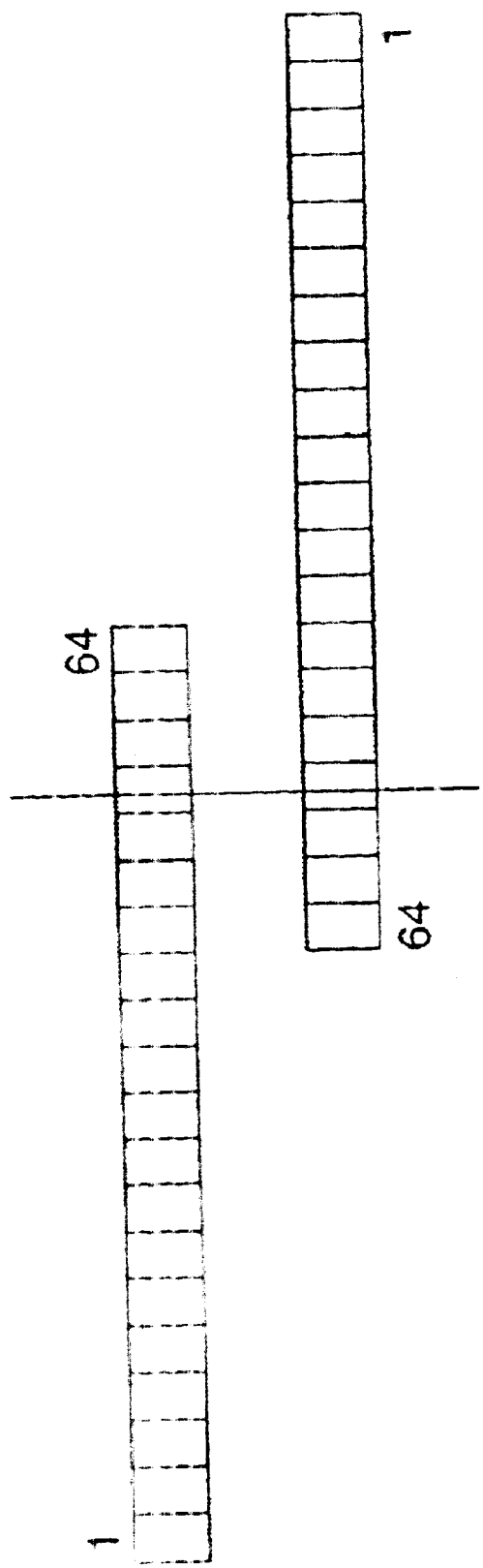
FIG. 14 is a diagram useful in describing the definition of reference coordinates according to the embodiment.

FIG. 14 is a diagram useful in describing the definition of reference coordinates according to the embodiment FIG. 14 illustrates an arrangement in which the coordinates of the linear CCDs 26 of the respective linear sensors 20Xa, 20Xb are disposed conceptually, each with pixels 1 through 64. Since the detection areas of the linear sensors 20Xa, 20Xb have the overlapping portions, as described earlier, FIG. 14 results when these coordinate positions are overlapped.

The linear CCDS 26 of the respective linear sensors 20Xa, 20Xb are both measurable areas and define a reference point in advance. More specifically, an input is applied to the overlapping portions on the screen 10 and is read in as coordinates CCDXa, CCDXb (CCDXa_org, CCDXb_org). These values are stored in a non-volatile memory (not shown) such as an EEPROM as reference-point data (reference coordinates). At the time of ordinary use, they are read out and coordinate values are calculated.

Figure 15:
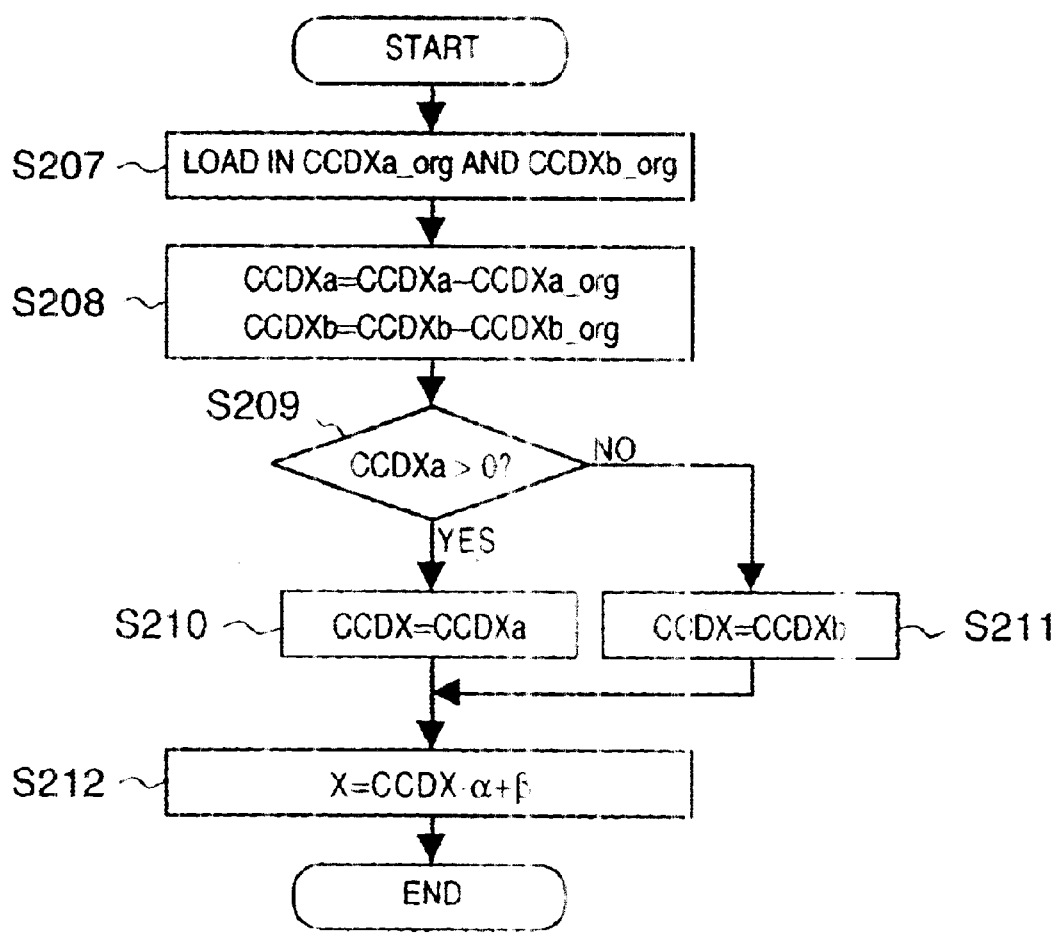
FIG. 15 is a flowchart illustrating the flow of processing for calculating a concatenated coordinate CCDX according to the embodiment.

Reference will now be had to FIG. 15 to describe processing for calculating the concatenated coordinate CCDX obtained by concatenating the coordinate values corresponding to the pixels on the linear CCDs 26 of the respective linear sensors 20Xa, 20Xb using the reference-point data.

FIG. 15 is a flowchart illustrating the flow of processing for calculating a concatenated coordinate CCDX according to this embodiment.

First, at step S207, the reference-point data (CCDXa_org, CCDXb_org) of the linear CCDs 26 of the respective linear sensors 20Xa, 20Xb are read in from the memory. Next, at step S208, the differences between the values of CCDXa, CCDXb, which are calculated when an input arrives from the designating tool 4, and the reference-point data are calculated. As a result, a conversion is made to coordinates, on the linear CCD, in which a point on a line L1 at the center of FIG. 14 serves as the origin.

This is followed by step S209, at which it is determined whether CCDXa is greater than zero. This embodiment is such that in a case where the value of CCDXa is greater than zero with Xa serving as the reference, namely a case where the value is to the left of L1, the value of CCDXa is adopted as a concatenated CCD coordinate CCDX. On the other hand, if the value of CCDXa is equal to or less than zero, the value of CCDXb is adopted as the concatenated CCD coordinate CCDX. Thus the coordinate values of the linear CCDs 26 of the respective linear sensors 20Xa, 20Xb can be concatenated with L1 serving as the boundary.

It should be noted that the decisions for this concatenation are made using the value of CCDXa. However, this does not impose a limitation; the value of CCDXb or the values of both CCDXa and CCDXb may be used.

More specifically, if CCDXa is greater than zero ("YES" at step S209), control proceeds to step S210, where the operation CCDX=CCDXa is performed. Control then proceeds to step S212. On the other hand, if CCDXa is equal to or less than zero ("NO" at step S209), control proceeds to step S211. Here the operation CCDX=CCDXb is performed and then proceeds to step S212.

Next, at step S212, a conversion is made from CCDX obtained by the foregoing processing to the coordinate value X on the screen 10. The conversion to the coordinate value X is performed using the following equation employing a magnification $\alpha$ and an offset $\beta$ measured in advance and stored in a non-volatile memory or the like:

$$X = CCDX \cdot \alpha + \beta$$

To obtain the magnification $\alpha$ and offset $\beta$, it will suffice to perform an input operation at a plurality of known points in advance and make a conversion from the CCDX coordinate and the coordinate value on the screen 10 at such time, in a manner similar to that of the reference-point data.

Though the above-described processing has been described with regard to the X coordinate, processing with regard to the Y coordinate is executed in similar manner.

In a case where coordinate calculation is performed using a plurality of the CCDs 26 of the kind in which the linear sensors 20Xa, 20Xb each have a linear CCD, as described above, the linear CCDs are provided with portions that overlap each other and reference coordinates (reference-point data) in which the overlapping portion serves as the reference are set, thereby making it possible to treat the linear CCDs as if they were a single linear CCD. Further, mounting discrepancies can be cancelled out. As a result, coordinate input over a larger area is made possible without inviting a decline in resolution or the like.

The data signal representing the coordinates (X,Y) calculated by the above-described processing is sent from the coordinate calculation unit 32 to the communication controller 33. This data signal and the control signal from the control signal detector 72 are input to the communication controller 33. The data signal and the control signal are both converted to communication signals of a predetermined format and then sent to an external display control unit. As a result, it is possible to perform various operations such as input of a cursor, menu, characters and line drawings on the screen 10.

Further, in a case where the sensor is constructed as an area sensor, four times the number of pixels and arithmetic data are required in order to double the resolution. By contrast, in a case where the sensor is constructed as a linear sensor, it will suffice to merely double the number of pixels for each of the X and Y coordinates. Accordingly, a higher resolution can readily be obtained by increasing the number of pixels.

In accordance with this embodiment as described above, the beam spot is turned on and off at a predetermined period by the designating tool, the signals prevailing when the beam spot is on and off are integrated separately and a difference signal between these signals is calculated. As a result, the position of a pixel at the peak level can be calculated precisely. Further, by placing a plurality of linear CCDS in such a manner that their detection areas overlap and setting a coordinate reference point in these overlapped detection areas, highly precise, high-resolution coordinates can be obtained. Further, it is possible to realize a small, light, low-cost apparatus in which the effects are extraneous light are suppressed.

In the embodiment described above, two linear sensors are constructed for each of X and Y coordinates and it is so arranged that the coordinates are calculated. However, this does not impose a limitation. In a case where the number of linear sensors is increased in order to accommodate a very large area, the present invention can be applied by providing the mutually adjacent linear sensors with overlapping portions and setting a reference point at the portions of overlap. Thus the invention is not limited to the number of linear sensors mentioned in the embodiment.

Industrial products contain so-called variation errors in terms of mounting position and manufacturing tolerance of parts, etc. When the outputs of a plurality of linear CCDs are concatenated in the manner described above, there are instances where error arises owing to a variation from one sensor to the next.

Figure 16:
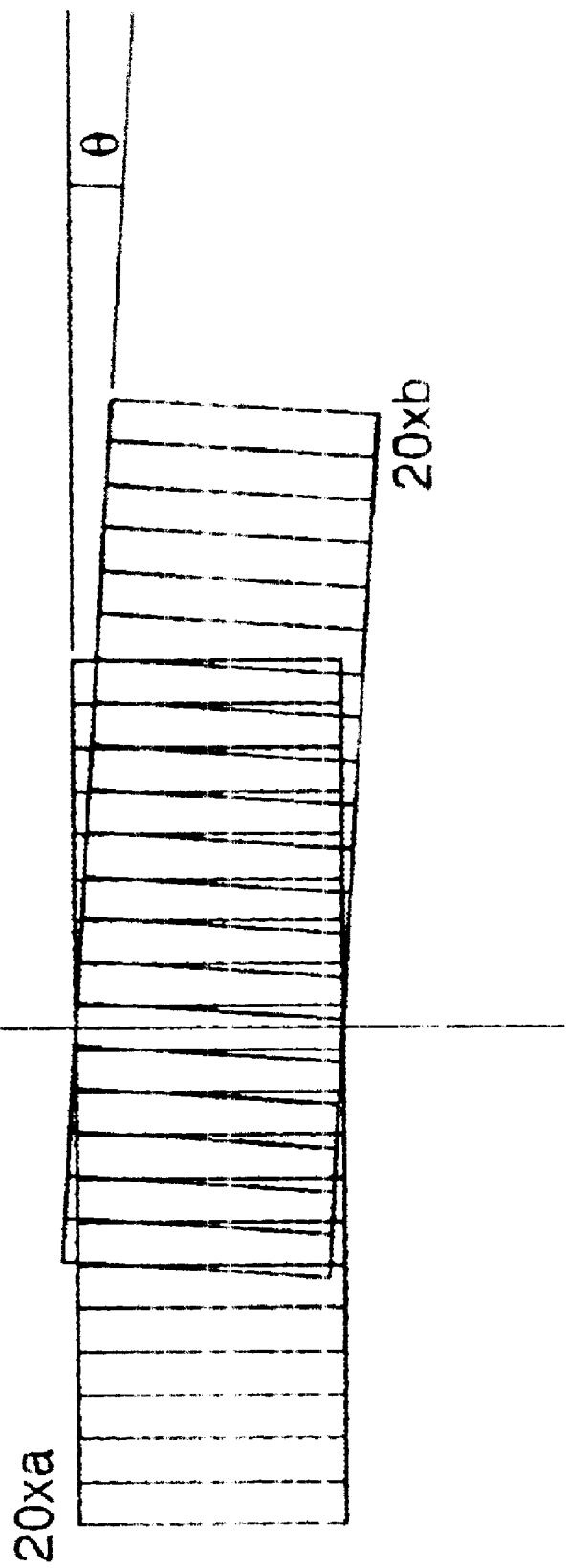
FIG. 16 is a diagram useful in describing inclination of a linear sensor.

By way of example, there is no problem if the linear sensors 20X$a$, 20X$b$ in the foregoing embodiment are on the same axis. However, if one linear sensor 20X$b$ is inclined with respect to the other linear sensor 20X$a$ by an angle θ, as shown in FIG. 16, an error will be produced at the point of connection between them. In this case, as shown in FIG. 17, a step is produced at the point of connection and the coordinate advances or retreats, i.e., a discontinuity occurs in which the X coordinate moves back and forth in a case where a straight line is drawn from left to right.

Figure 17:
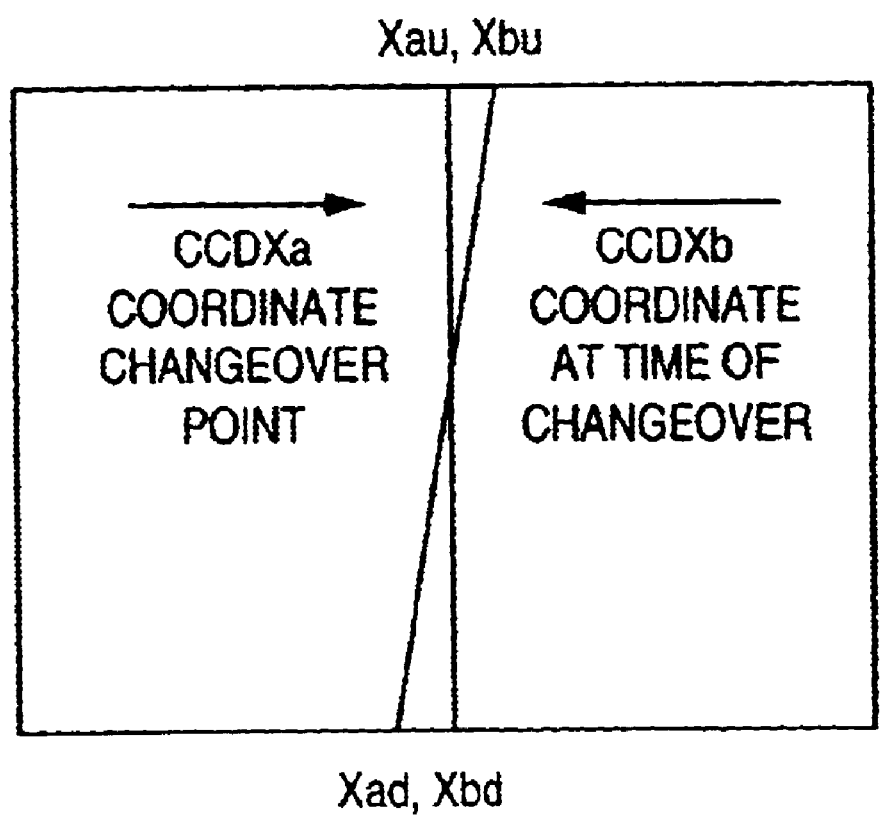
FIG. 17 is a diagram useful in describing a coordinate changeover point in a case where a linear sensor is inclined.

In order to mitigate this error, each coordinate is measured with respect to an input of end points of a CCDXa coordinate changeover point in FIG. 17.

Let Xau, Xbu represent the X coordinates of the upper ends, Xad, Xbd the X coordinates of the lower ends, and Ydist the distance from an upper-end reference point to a lower-end reference point. A sensor coordinate quantity ΔX to be corrected is calculated as follows using the y coordinate:

$$\Delta X = y \cdot Ydist/(Xau-Xbu)-(Xad-Xbd)$$

Further, let Xar, Xbr represent the Y coordinates of the upper ends, Xa1, Xb1 the X coordinates of the lower ends, and XYdist the distance from an upper-end reference point to a lower-end reference point. A sensor coordinate quantity ΔY to be corrected is calculated as follows using the x coordinate:

$$\Delta Y = x \cdot Xdist/(Yar-Ybr)-(Ya1-Xb1)$$

If ΔX, ΔY are used to correct the CCDXb coordinate, for example, and a changeover is made, a discontinuity in the coordinates will not occur.

In this case, inclination of the overall screen is not addressed. The above-described method is strictly for correcting the output of one sensor using the output of the other sensor, such as the output of the linear sensor 20X$a$, as a reference. Transformation of the coordinate system or the like is required as a separate correction.

In this regard, the problem can be solved if a two-dimensional coordinate transformation is carried out after the above-described correction.

A variance in scale caused by a variance in lens-to-CCD distance is another cause of variance error.

In a case where the coordinates of points equidistant from a certain point are compared with the coordinates of both CCDXa and CCDXb, there are instances where the sizes of the coordinates differ. At such times it will suffice to correct the sensor output of the linear sensor 20X$b$ so as to achieve conformity with the size of the linear sensor 20X$a$. For example, if we let MXa and MXb represent the sensor outputs of the linear sensors 20X$a$ and 20X$b$, respectively, at the equidistant points, it is possible to effect a correction by multiplying the CCDXb coordinate by a numerical value, namely a correction coefficient κ=MXa/MWb. By making this correction, a plurality of CCDs can be used to improve resolution and assure precision.

The present invention can be applied to a system constituted by a plurality of devices (e.g., a host computer, interface, reader, printer, etc.) or to an apparatus comprising a single device (e.g., a copier or facsimile machine, etc.).

Furthermore, it goes without saying that the object of the invention is attained also by supplying a storage medium storing the program codes of the software for performing the functions of the foregoing embodiment to a system or an apparatus, reading the program codes with a computer (e.g., a CPU or MPU) of the system or apparatus from the storage medium, and then executing the program codes.

In this case, the program codes read from the storage medium implement the novel functions of the embodiment and the storage medium storing the program codes constitutes the invention.

Examples of storage media that can be used for supplying the program code are a floppy disk, hard disk, optical disk, magneto-optical disk, CDROM, CD-R, magnetic tape, non-volatile type memory card or ROM, etc.

Furthermore, besides the case where the aforesaid functions according to the embodiment are implemented by executing the program codes read by a computer, it goes without saying that the present invention covers a case where an operating system or the like running on the computer performs a part of or the entire process in accordance with the designation of program codes and implements the functions according to the embodiment.

It goes without saying that the present invention further covers a case where, after the program codes read from the storage medium are written in a function expansion board inserted into the computer or in a memory provided in a function expansion unit connected to the computer, a CPU or the like contained in the function expansion board or function expansion unit performs a part of or the entire process in accordance with the designation of program codes and implements the function of the above embodiment.

In a case where the present invention is applied to the above-mentioned storage medium, program code corresponding to the flowcharts shown in FIGS. 11, 13 and 15 described earlier would be stored on this storage medium.

As many apparently widely different embodiment of the present invention can be made without departing from the spirit and scope thereof, it is to be understood that the invention is not limited to the specific embodiments thereof except as defined in the appended claims.

What is claimed is:

1. A coordinate input apparatus in which light from a designating tool is applied to a prescribed position on a coordinate input screen to produce a light spot and coordinates corresponding to the light spot are generated, the apparatus comprising:

a plurality of sensing means, arranged in one coordinate axis, for sensing the light spot;

correction means for correcting results of sensing from each of said plurality of sensing means;

concatenation means for concatenating data that has been corrected by said correction means; and output means for outputting coordinate values corresponding to the light spot based upon the data concatenated by said concatenation means;

wherein portions of areas from which said plurality of sensing means sense light overlap, wherein said plurality of sensing means comprises first sensing means and second sensing means, and wherein said correction means corrects the results of sensing from each of said plurality of sensing means based upon inclination of said second sensing means relative to said first sensing means.

2. The apparatus according to claim 1, wherein said correction means corrects the results of sensing from each of said plurality of sensing means based upon reference coordinate values that have been stored in advance.

3. The apparatus according to claim 1, wherein each of said plurality of sensing means is a linear sensor comprising a plurality of optoelectronic transducers arrayed on a straight line.

4. The apparatus according to claim 1, wherein said correction means corrects the results of sensing from each of said plurality of sensing means based upon a magnification, which is for calculating coordinates, set for each of said plurality of sensing means.

5. The apparatus according to claim 1, wherein each sensing means of said plurality of sensing means is a sensor comprising a substantially linear array of pixels.

6. A coordinate input method in which light from a designating tool is applied to a prescribed position on a coordinate input screen to produce a light spot and coordinates corresponding to the light spot are generated, the method comprising:

a correction step of correcting results of sensing from each of a plurality of sensing units, arranged in one coordinate axis, for sensing the light spot;

a concatenation step of concatenating data that has been corrected at said correction step; and an output step of outputting coordinate values corresponding to the light spot based upon the data concatenated at said concatenation step;

wherein portions of areas from which the plurality of sensing units receive light overlap, wherein said correction step corrects the results of sensing from each of the plurality of sensing units based upon inclination of a second sensing unit relative to a first sensing unit among the plurality of sensing units.

7. The method according to claim 6, wherein said correction step corrects the results of sensing from each of the plurality of sensing units based upon reference coordinate values that have been stored in advance.

8. The method according to claim 6, wherein each of the plurality of sensing units is a linear sensor comprising a plurality of optoelectronic transducers arrayed on a straight line.

9. The method according to claim 6, wherein said correction step corrects the results of sensing from each of the plurality of sensing units based upon a magnification, which is for calculating coordinates, set for each of the plurality of sensing units.

10. A computer-readable memory storing coordinate-input program code for performing a method in which light from a designating tool is applied to a prescribed position on a coordinate input screen to produce a light spot and coordinates corresponding to the light spot are generated, said program code comprising:

program code of a correction step of correcting results of sensing from each of a plurality of sensing units, arranged in one coordinate axis, for sensing the light spot;

program code of a concatenation step of concatenating data that has been corrected at the correction step; and program code of an output step of outputting coordinate values corresponding to the light spot based upon the data concatenated at the concatenation step;

wherein portions of areas from which the plurality of sensing units receive light overlap, wherein said program code of a correction step corrects the results of sensing from each of the plurality of sensing units based upon inclination of a second sensing unit relative to a first sensing unit among the plurality of sensing units.

* * * * *

UNITED STATES PATENT AND TRADEMARK OFFICE
CERTIFICATE OF CORRECTION

PATENT NO. : 6,714,310 B1
DATED : March 30, 2004
INVENTOR(S) : Atsushi Tanaka et al.

It is certified that error appears in the above-identified patent and that said Letters Patent is hereby corrected as shown below:

<u>Title page,</u>
Item [56], References Cited, U.S. PATENT DOCUMENTS, "5,806,287" should read -- 5,805,287 --.

<u>Column 4,</u>
Line 34, "battery." should read -- battery, --.

Signed and Sealed this

Thirtieth Day of November, 2004

JON W. DUDAS
*Director of the United States Patent and Trademark Office*